(12) United States Patent
Thomas, III et al.

(10) Patent No.: US 6,359,745 B1
(45) Date of Patent: *Mar. 19, 2002

(54) LATENT ILLUMINANCE DISCRIMINATION MARKER SYSTEM FOR DATA STORAGE CARTRIDGES

(75) Inventors: Fred C. Thomas, III, Ogden; Glenn B. Dixon, West Point; Todd R. Shelton, Syracuse; Todd L. Graves, Garland; Allen T. Bracken, Layton, all of UT (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/160,727

(22) Filed: Sep. 25, 1998

Related U.S. Application Data

(63) Continuation-in-part of application No. 08/936,970, filed on Sep. 26, 1997.

(51) Int. Cl.[7] ..................... G11B 19/02; G11B 23/033
(52) U.S. Cl. .......................... 360/69; 360/133
(58) Field of Search .................. 360/69, 60, 71, 360/75, 132, 133; 369/291

(56) References Cited

U.S. PATENT DOCUMENTS

| | | |
|---|---|---|
| 3,207,910 A | 9/1965 | Hirschfeld et al. |
| 3,412,245 A | 11/1968 | Halverson |
| 3,444,517 A | 5/1969 | Rabinow |
| 3,468,046 A | 9/1969 | Makishima |
| 3,473,027 A | 10/1969 | Freeman et al. |
| 3,483,388 A | 12/1969 | Ogle et al. |
| 3,513,320 A | 5/1970 | Weldon |
| 3,522,432 A | 8/1970 | Ortlieb |
| 3,614,430 A | 10/1971 | Berler |
| 3,654,463 A | 4/1972 | Geusic et al. |

(List continued on next page.)

FOREIGN PATENT DOCUMENTS

| | | |
|---|---|---|
| DE | 2135059 | 1/1973 |
| DE | 29 15 423 A1 | 10/1979 |
| DE | 41 24 833 C2 | 9/1993 |
| DE | 29 60 7075 U | 8/1996 |
| DE | 195 25 677 C1 | 12/1996 |

(List continued on next page.)

OTHER PUBLICATIONS

Ryer, A., *Light Measurement Handbook*, Index, http://www.intl–light.com/handbook, 1997–1998, 3 pages.

Ryer, A., "The Power of Light", *Light Measurement Handbook*, http://www.intl–light.com/handbook/ch02.html, 1997–1998, 4 pages.

Ryer, A., "Measurement Geometries", *Light Measurement Handbook*, http://www.intl–light.com/handbook/ch07.html, 1997–1998, 10 pages.

Internet pages regarding "irradiation", 1 page; "irradiance", 1 page; "radiant power", 1 page; "radiant energy", 1 page; "time", 1 page; "time scale", 1 page; and "Spectral Irradiance", 1 page.

Saleh, B.E. et al., *Fundamentals of Photonics*, John Wiley & Sons, Inc., 454–457.

(List continued on next page.)

*Primary Examiner*—David Hudspeth
*Assistant Examiner*—James L Habermehl
(74) *Attorney, Agent, or Firm*—Woodcock Washburn LLP

(57) ABSTRACT

A data storage cartridge for a data storage disk drive has a latent illuminance marker. A light source illuminates the marker and the marker emits illuminance as phosphorescence. A photosensor detects the emitted illuminance, and the decay time is determined. The decay time is checked to provide identification of different types or generations of data storage cartridges.

63 Claims, 12 Drawing Sheets

U.S. PATENT DOCUMENTS

| | | |
|---|---|---|
| 3,718,078 A | 2/1973 | Plummer |
| 3,738,299 A | 6/1973 | Packler et al. |
| 3,760,161 A | 9/1973 | Lohne et al. |
| 3,830,682 A | 8/1974 | Rowland |
| 3,894,164 A | 7/1975 | Dismukes et al. |
| 4,019,060 A | 4/1977 | Woodman |
| 4,047,033 A | 9/1977 | Malmberg et al. |
| 4,058,732 A | 11/1977 | Wieder ................. 250/461 B |
| 4,146,792 A | 3/1979 | Stenzel et al. |
| 4,211,813 A | 7/1980 | Gravisse et al. |
| 4,297,584 A | 10/1981 | Buchanan et al. |
| 4,374,328 A | 2/1983 | Tekippe et al. |
| 4,442,170 A | 4/1984 | Kaule et al. |
| 4,451,521 A | 5/1984 | Kaule et al. |
| 4,485,308 A | 11/1984 | Rabatin |
| 4,533,244 A | 8/1985 | Kaule et al. |
| 4,571,085 A | 2/1986 | Anderson |
| 4,633,451 A | 12/1986 | Ahn et al. |
| 4,650,320 A | 3/1987 | Chapman et al. |
| 4,791,310 A | 12/1988 | Honig et al. |
| 4,839,092 A | 6/1989 | Lindmayer |
| 4,866,694 A | 9/1989 | Korth |
| 4,908,516 A | 3/1990 | West |
| 4,915,982 A | 4/1990 | Lindmayer |
| 5,029,034 A | 7/1991 | Weiley |
| 5,038,359 A | 8/1991 | Pepper et al. |
| 5,042,020 A | 8/1991 | Endo |
| 5,210,411 A | 5/1993 | Oshima et al. |
| 5,220,166 A | 6/1993 | Takeuchi et al. |
| 5,270,854 A | 12/1993 | Lee et al. |
| 5,289,451 A | 2/1994 | Ashinuma et al. |
| 5,325,243 A | 6/1994 | Rath et al. |
| 5,329,127 A | 7/1994 | Becker et al. ........... 250/459.1 |
| 5,351,268 A | 9/1994 | Jensen et al. ............... 374/131 |
| 5,414,266 A | 5/1995 | Sun ........................ 250/459.1 |
| 5,463,212 A | 10/1995 | Oshima et al. |
| 5,471,281 A | 11/1995 | Hayashi et al. |
| 5,491,586 A | 2/1996 | Phillips |
| 5,495,466 A | 2/1996 | Dohmeier et al. |
| 5,525,798 A | 6/1996 | Berson et al. |
| 5,548,106 A | 8/1996 | Liang et al. |
| 5,576,110 A | 11/1996 | Lin et al. |
| 5,604,006 A | 2/1997 | Ponchaud et al. |
| 5,608,225 A | 3/1997 | Kamimura et al. |
| 5,611,958 A | 3/1997 | Takeuchi et al. |
| 5,638,228 A | 6/1997 | Thomas, III ................ 360/60 |
| 5,668,363 A | 9/1997 | Nishida et al. |
| 5,745,460 A | 4/1998 | Tateishi |
| 5,745,461 A | 4/1998 | Kawasaki |
| 5,790,489 A | 8/1998 | O'Connor |
| 5,798,992 A * | 8/1998 | Kaneko et al. ........... 369/54 X |
| 5,914,167 A * | 6/1999 | Odagiri .................. 369/283 X |
| 6,067,214 A * | 5/2000 | Thomas, III ................ 360/133 |
| 6,091,563 A * | 7/2000 | Thomas, III et al. ......... 360/69 |

FOREIGN PATENT DOCUMENTS

| | | |
|---|---|---|
| EP | 0 716 102 A1 | 6/1996 |
| EP | 0 802 499 A2 | 10/1997 |
| GB | 1 232 570 | 5/1971 |
| GB | 2018984 A | 10/1979 |
| JP | 4-61650 | 2/1992 |
| JP | 4-167286 | 6/1992 |
| JP | 6-18540 | 6/1994 |
| WO | WO 95/19605 | 7/1995 |
| WO | WO 97/10307 | 3/1997 |

OTHER PUBLICATIONS

Kuchling, H., *Taschenbuch der Physik*, Verelag Harri Deutsch, 1979, 363–364.

Patent Abstracts of Japan, vol. 18(85), published Feb. 1994, Appl'n No. 4–113,999, Sugarawa.

Jacobs, S.F., "Experiments with retrodirective arrays", *Optical Engineering*, 1982, 21(2), 281–283.

Rennilson, J. "Retroreflection—What is it and how is it used?", *ASTM Standardization News*, Feb. 1982, 3 pages.

Venable, Jr. et al., "Factors affecting the metrology of retroreflecting materials", *Applied Optics*, 1980, 19(8), 1242–1246.

Walker, J. "The Amateur Scientist: Wonders with the retroreflector, a mirror that removes distortion from a light beam", *Scientific American*, 1988, 258(1), 118–123.

Reflexite Corporation Brochure NA1010, "Reflectors for Photoelectric Controls", Apr. 1993, 4 pages.

Lerner, J.S., Shie, R., Petersen, J., "Holographic Light Shaping Diffusers", presented at The Aerospace Lighting Institute, Advanced Seminar, Feb. 1994, Los Angeles, CA, 4 pages.

Physical Optics Corporation Brochure JL1–493, "Light Shaping Diffusers", 2 pages.

The Optometrics Group Catalog, "Optical Components & Instruments Catalog—Gratings", 1996, 28–35.

Kathman, A. et al., "Binary Optics: New Diffractive Elements for the Designer's Tool Kit", The Photonics Design & Applications Handbook®, Laurin Publishing Co., Inc., 1994 (Book 3), H358–H360.

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D. et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

Lockyer et al., "Photonics vs. Counterfeiters", *Photonics Spectra*, Nov. 1996, 70–82.

U.S. application No. 08/746,085, Edwards et al., filed Nov., 1996.

* cited by examiner

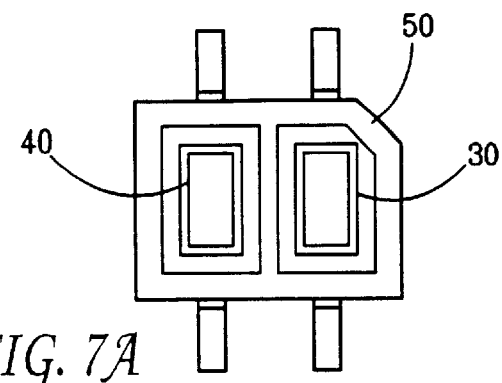
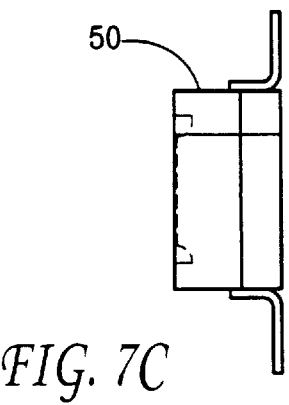
FIG. 7A
FIG. 7C
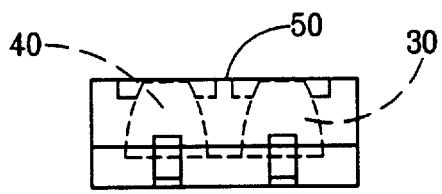
FIG. 7B
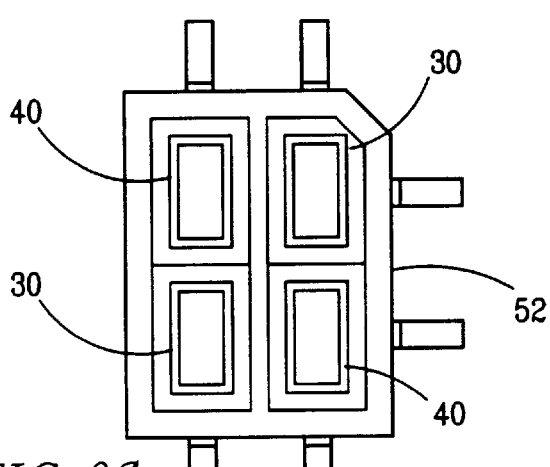
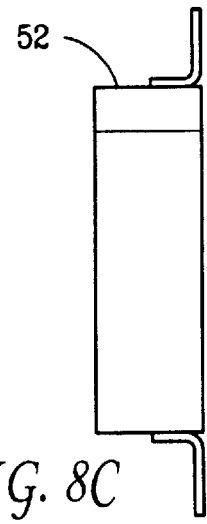
FIG. 8A
FIG. 8C
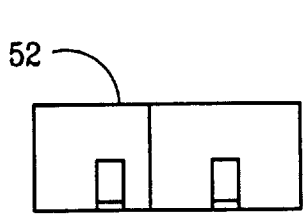
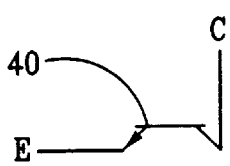
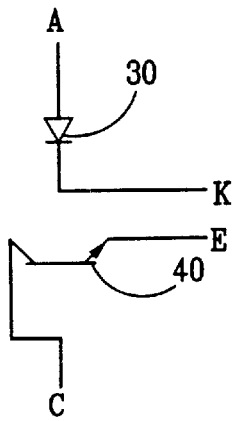
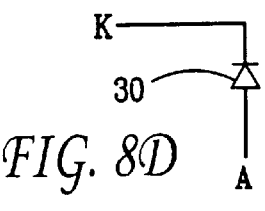
FIG. 8B
FIG. 8D

LATENT ILLUMINANCE DISCRIMINATION MARKER SYSTEM FOR DATA STORAGE CARTRIDGES

This application is a continuation-in-part application of Ser. No. 08/936,970, filed on Sep. 26, 1997.

FIELD OF THE INVENTION

The present invention relates in general to a marker for identifying an object in a system which includes a source of irradiance and a detector of light emitted from the marker. More particularly, the present invention relates to a removable data storage cartridge and to a data storage drive for receiving the cartridge. Even more particularly, the present invention relates to detecting the presence of the correct disk cartridge in the data storage drive by use of a latent illuminance tag on the cartridge.

BACKGROUND OF THE INVENTION

Disk drives for receiving removable disk cartridges, including conventional 3.5 inch floppy disk drives, must have some mechanism for detecting the insertion or presence of a disk cartridge in the drive. The actuator that carries the recording heads of the disk drive across the recording surfaces of the disk should not be allowed to move unless the presence of an appropriate disk cartridge which is non-drive damaging is detected. The removability feature requires that the disk drive have a cartridge insertion opening into which foreign objects can be inserted. If these objects physically engage the drive as a legitimate cartridge would, then the heads could be loaded onto or into the foreign object, thereby destroying the drive. Also, the spindle motor of the disk drive will be activated by a falsely detected foreign object, thereby generating particle debris. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present. "RETROREFLECTIVE MARKER FOR DATA STORAGE CARTRIDGE", U.S. Pat. No. 5,638,228, to Thomas, III, describes the reflection of a highly concentrated quasi circular lobe of light whose spread on reflection is captured by the aperture of a phototransistor in close proximity to a light emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive. This patent is incorporated herein by reference.

Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICES PERFORMING DIVERSE FUNCTIONS", Ser. No. 08/746,085, filed Nov. 6, 1996, Edwards, et al. (Attorney's Docket IOM-9319) describes such mini-cartridges, mini-drives, and hand-held devices. This application is incorporated herein by reference.

As disk storage products become smaller and smaller, the need for a cartridge marker of thinner physical size is required. In very thin disk drives where the distance between the cartridge tag and the optical sensing device is very small (e.g., 1 mm), the inherent reflective gain mechanism obtained with a retroreflector over a diffuse or specular reflector is lost. Holographic directional light control is possible, but due to the very small working distances the ability for false engagement of the drive is significantly increased with that approach.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

A "caddy" cartridge, as mentioned in the aforementioned Edwards, et al. application provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading. This invention provides a solution of these problems also.

Another problem associated with the detection of LED light reflected from any reflective material is the occurrence of illuminance hot spots or structure in the LED output which often results in uneven illumination of the cartridge marker. Reflective cartridge markers can also become faded, scratched, or soiled. These factors combine to make the amplitude of the detected light signal highly variable.

Recently, in various industries such as the distribution industry, phosphors have been used in the control of goods by means of bar codes, and furthermore, bar codes are printed on various prepaid cards and passing cards, and these bar codes are read by optical reading apparatuses such as scanners to perform the desired actions. Moreover, various attempts have been made to apply forgery preventive means to credit cards and prepaid cards or to detect forged cards. For example, the marks such as bar codes are printed with an ink containing a phosphor by offset printing or by using an ink ribbon to form latent image marks. The latent image marks are irradiated with a semiconductor laser beam to excite the phosphor and the light emitted from the phosphor is received to read the bar code information by an optical reading apparatus. These techniques use the content or spectral shift from the irradiating light source for identification.

Although the art of detecting and discriminating between data storage cartridges is well developed, there remain some problems inherent in this technology, particularly when the distance between the cartridge tag and the optical sensing device is between about 1 mm and about 15 mm. Therefore, a need exists for a tag that produces reliable detection and discrimination between data storage cartridges under varying gain and marker spacings.

SUMMARY OF THE INVENTION

The present invention is directed to a data storage drive comprising a source of irradiance; a detector of irradiance; and means for enabling the drive. The detector is connected to enable the means for enabling the drive when the detected irradiance indicates a predetermined decay time. The source of irradiance is preferably a light emitting diode (LED), and more preferably, a flood LED. The detector is preferably a phototransistor or a photodiode.

According to one aspect of the present invention, the drive further comprises monitoring means for monitoring the output of the detector and determining a decay time of the detected irradiance. The detector is connected to enable the drive when the decay time substantially equals the predetermined decay time. Preferably, the monitoring means comprises a microprocessor.

According to another aspect of the present invention, the drive further comprises a filter for filtering at least one predetermined wavelength from entering the detector.

In a further embodiment within the scope of the present invention, the data storage drive is adapted to receive a cartridge comprising a body; a data storage medium in the body; and a marker on the body. The marker is a latent illuminance material which receives irradiance from the source and emits irradiance toward the detector for detection, and the detector is connected to enable the means for enabling the drive when the detected irradiance indicates a predetermined decay time.

According to a further aspect of the present invention, the drive further comprises a plurality of sources of irradiance to emit irradiance at a first plurality of wavelengths; and a plurality of detectors of irradiance to detect irradiance at a second plurality of wavelengths, whereby detection of particular ones of the second plurality of wavelengths identifies a type of cartridge.

According to further aspects of the present invention, ratiometric measurements on the second plurality of wavelengths identify a type of cartridge. The marker has a latent illuminance wavelength spectrum in the range between about 450 nm and about 1050 nm, and preferably has a latent illuminance wavelength spectrum in the range between about 680 nm and about 800 nm.

According to further aspects of the present invention, the irradiance wavelength is outside of the latent illuminance wavelength spectrum, and the latent illuminance material comprises a phosphorescent material. Preferably, the phosphorescent material comprises a rare earth phosphor, which is a Stokes phosphor or an anti-Stokes phosphor.

According to further aspects of the present invention, the latent illuminance material has a decay time which is used to identify the cartridge. Preferably, the decay time is in the range between about 50 $\mu$sec and about 3,000 $\mu$sec. The decay time is an amount of time for the irradiance emitted from the marker to decay to a predetermined intensity value. According to one aspect, the decay time is an amount of time for the irradiance emitted from the marker to decay from a first intensity value to a second intensity value.

The irradiance emitted from the marker has an intensity that decays exponentially or as the sum of a plurality of differently weighted exponential decays. Preferably, the intensity of the irradiance decays according to $e^{-(t/(T/X))}$, where T is a decay time constant for a predetermined amount of decay, X is a predetermined constant, and t is a time that has elapsed from when the source of irradiance stops providing the irradiance.

According to further aspects of the present invention, the latent illuminance material is coated on a pressure sensitive sticker substrate, is suspended in one of an adhesive compound and a glue, is blended with an ink and printed on the body, or is injection molded on the body.

According to one aspect of the present invention, the marker further comprises a filter to absorb light having a predetermined range of wavelengths. The filter comprises a thin film coating spectral absorption layer and/or the filter comprises a rare earth element. Preferably, the rare earth element is ytterbium.

Another embodiment within the scope of this invention includes a combination of a data storage drive and a cartridge for the drive. The drive comprises a source of irradiance at an irradiance wavelength; a detector of irradiance; and means for enabling the drive. The cartridge comprises a body; a data storage medium in the body; and a marker on the body. The marker is a latent illuminance material which receives irradiance from the source and emits irradiance having a spectral characteristic toward the detector for detection, and the detector is connected to enable the means for enabling the drive when the detected spectral characteristic indicates a predetermined characteristic.

Another embodiment within the scope of this invention is directed to a combination of a data storage drive and a cartridge for the drive. The drive comprises a source of irradiance at an irradiance wavelength; a detector of irradiance; and means for enabling the drive. The cartridge comprises a body; a data storage medium in the body; and means for providing irradiance having a decay time toward the detector for detection. The detector is connected to enable the means for enabling the drive when the decay time of the detected irradiance substantially equals a predetermined decay time.

Preferably, the means for providing irradiance comprises means for detecting the irradiance from the source of irradiance; and means for emitting decaying irradiance toward the detector for detection when the irradiance is detected from the source of irradiance by the means for detecting. The means for detecting the irradiance from the source of irradiance comprises a photodetector on the body for detecting the irradiance from the source of irradiance, and the means for emitting decaying irradiance comprises a light source on the body and electrically connected to the photodetector.

According to further aspects of the present invention, the light source is an LED, the photodetector and the light source are disposed on an integrated circuit, and the integrated circuit is powered by a battery or the source of irradiance.

The foregoing and other aspects of the present invention will become apparent from the following detailed description of the invention when considered in conjunction with the accompanying drawings.

BRIEF DESCRIPTION OF THE DRAWINGS

FIGS. 7A to 7C respectively show top, side and edge views of an emitter/detector pair positioned in the drive to detect the latent illuminance marker;

FIGS. 8A to 8D respectively show top, edge, and side views and an electrical schematic of an emitter/detector system suitable for use in the drives;

DESCRIPTION OF EXEMPLARY EMBODIMENTS AND BEST MODE

The present invention is directed to a latent illuminance marker (hereinafter also referred to as a tag) which is used to identify and discriminate the type of data storage cartridge (hereinafter also referred to as a disk cartridge) that has been inserted into a disk drive. The present invention provides an optical detection mechanism so that it can be ascertained with near certainty that an inserted object is an appropriate disk cartridge. The tag system is a highly effective discriminant of appropriate cartridge insertion for a disk drive and can also be used to prevent unauthorized copies of software from being easily reproduced and used in disk drives. One means of effecting this software protection is to make the latent illuminance tag alone or in conjunction with data on the storage media a key mechanism which is inserted in the data storage drive for operation of the software. It should be noted that the term "illuminance" as used herein includes, but is not limited to, irradiance and the spectrum of light including ultra-violet (UV), visible, and near infrared.

Figure 1:
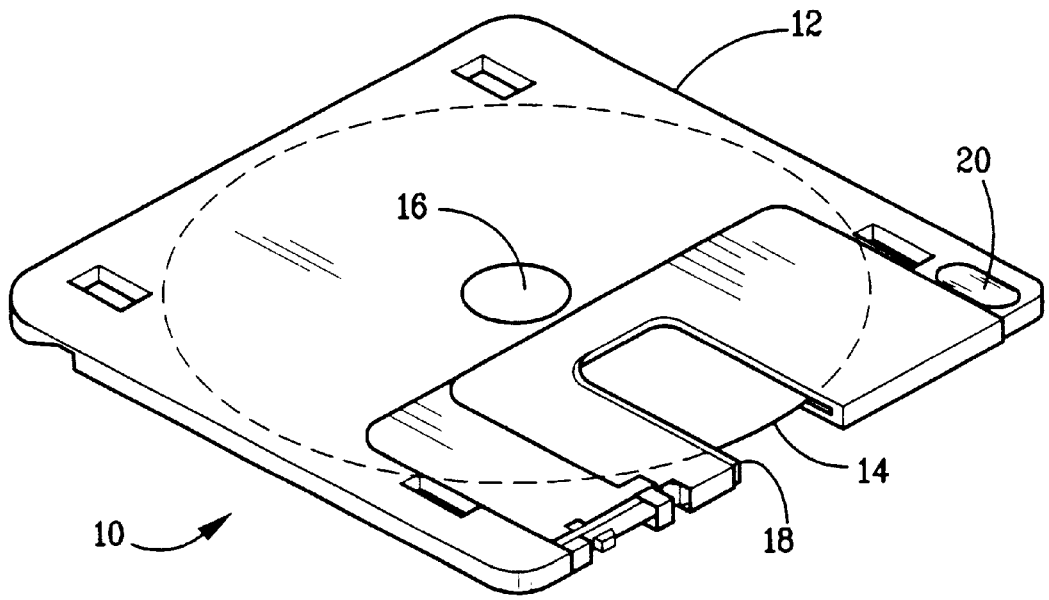
FIG. 1 shows an exemplary data storage cartridge of the present invention.
Figure 2:
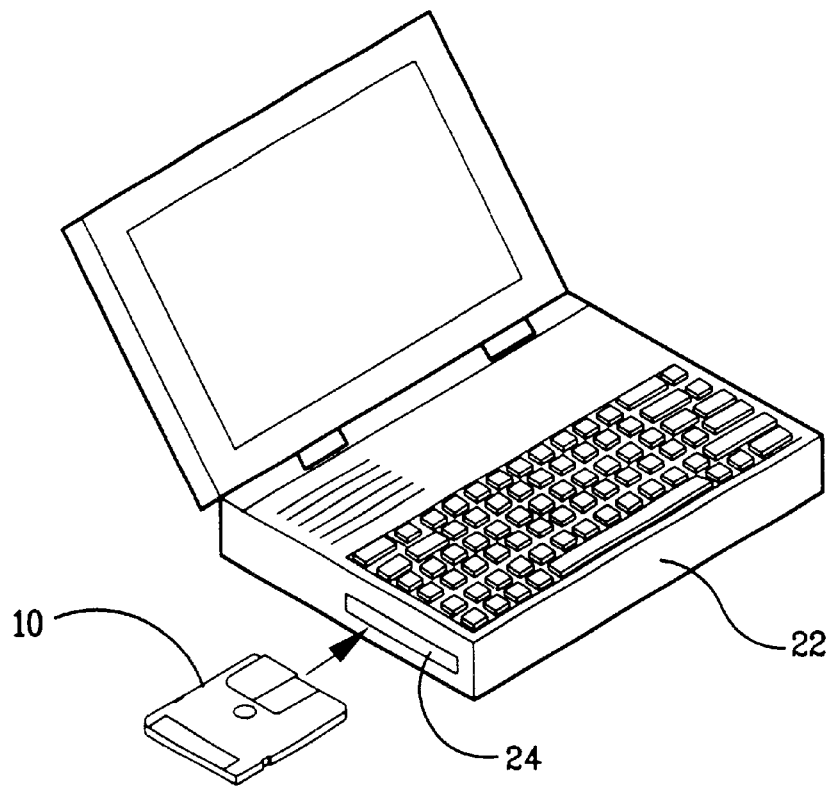
FIG. 2 is a perspective view of a device in which the invention is used.

FIGS. 1 and 2 show a cartridge and a disk drive to which the present invention is applicable. The cartridge and drive are described in the co-pending application entitled "INTERCHANGEABLE CARTRIDGE DATA STORAGE SYSTEM FOR DEVICES PERFORMING DIVERSE FUNCTIONS", Ser. No. 08/746,085, filed Nov. 6, 1996 (Attorney Docket No. IOM-9319), which is incorporated herein by reference.

The disk cartridge 10 comprises an outer casing 12 and a disk-shaped recording medium 14 which is affixed to a hub 16 that is rotatably mounted in the casing 12. An opening on the bottom shell of the casing 12 provides access to the disk hub 16. A head access opening in the front peripheral edge 18 of the disk cartridge 10 provides access to the recording surfaces of the disk by the recording heads of a disk drive.

In accordance with the present invention, a latent illuminance marker, or tag, 20 is positioned on the disk cartridge 10 to be detected by a detector in a disk drive.

FIG. 2 shows a laptop computer 22 which has a disk drive 24 for receiving the disk cartridge 10 of FIG. 1. The drive 24 may be the Iomega ZIP drive which is disclosed and claimed in the U.S. patents identified in U.S. Pat. No. 5,638,228.

The latent illuminance marker 20 on the cartridge 10 is desirably very thin in order for the cartridge to fit in the thin form factor of the drive. Although any material exhibiting latent illuminant properties or characteristics can be used in accordance with the present invention, a phosphorescent material is used in a preferred embodiment of this invention. The latent illuminance material in accordance with the invention can comprise either a Stokes phosphor or an anti-Stokes phosphor. A Stokes phosphor is a frequency down converter in which the material is excited with a shorter wavelength or higher frequency light which results in the emission of light of various wavelengths which are longer in wavelength and lower in frequency. An example of a Stokes phosphor is one which is excited with a light of about 660 nm and emits latent irradiance at between about 680 and about 800 nm. An anti-Stokes phosphor is a frequency up converter in which the material is excited with a longer wavelength or lower frequency light which results in the emission of light of various wavelengths which are shorter in wavelength and higher in frequency. Materials of this type are often used for the detection of infrared radiation.

The present invention is directed to a latent illuminance tag, preferably phosphorescent, that can be attached to a data storage cartridge as a sticker, or printed into a, or applied via suspension in an adhesive compound such as a UV curable epoxy onto a data storage cartridge. On each disk cartridge having an authorized copy of the software, there is a tag which is preferably coated with a phosphorescent photoluminent material which serves to identify the type or generation of disk cartridge and distinguish it from other types of disk cartridges and purely passive light reflectors.

Figure 3A:
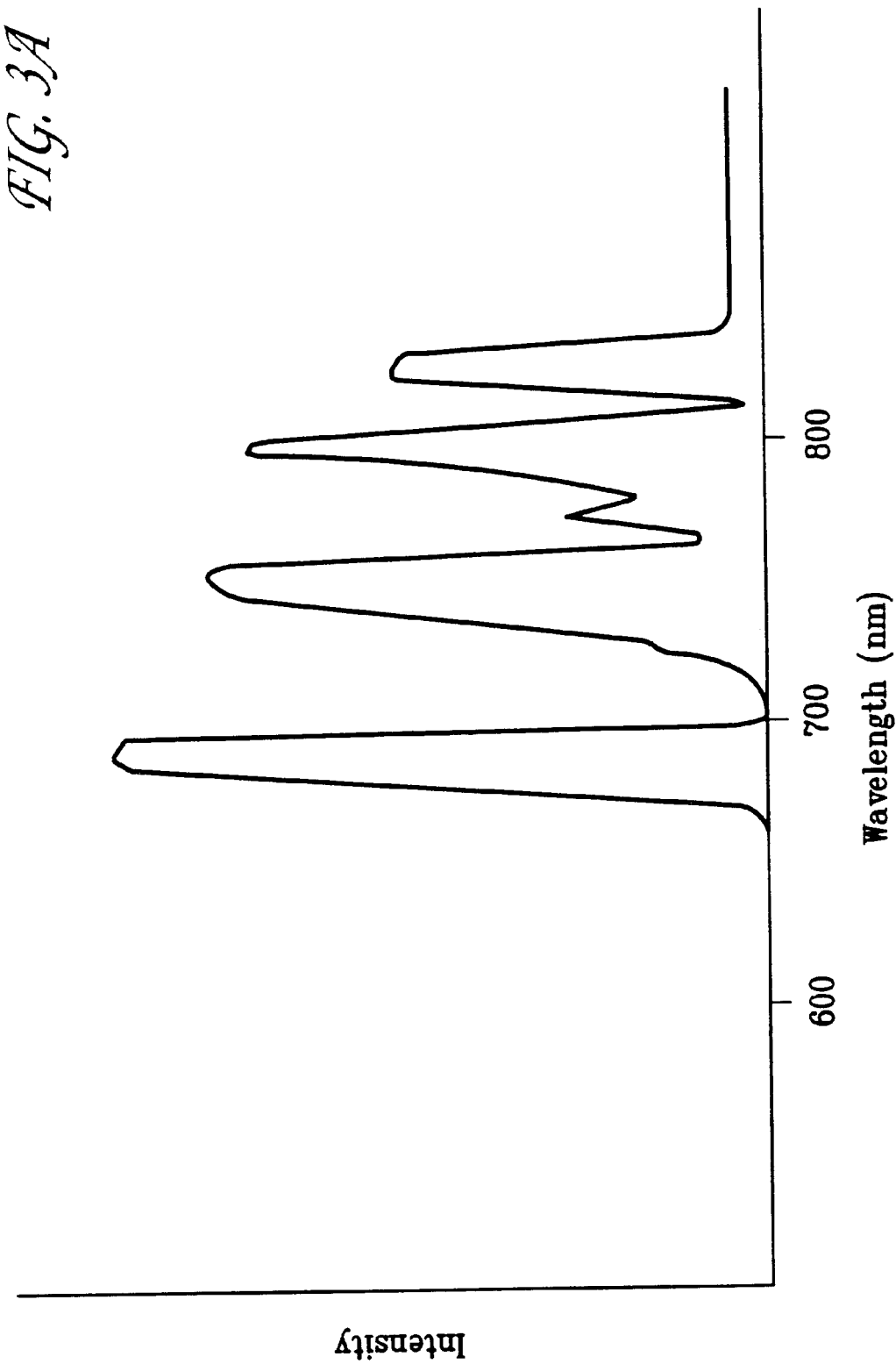
FIG. 3A is an exemplary latent illuminance output spectrum for a tag in accordance with the present invention.

The phosphor type materials used in the phosphorescent tag fluoresce for a period of time after a light source, preferably an LED, that has illuminated the tag is turned off. The LED strikes the tag at an excitation wavelength and the light emitted from the tag has a wavelength (or wavelengths) that is shifted from the excitation wavelength. The wavelength(s) can be shorter or longer than the excitation wavelength. As described above, the light emission from the tag is called phosphorescence. An exemplary latent illuminance output spectrum for a tag in accordance with the present invention is shown in FIG. 3A. The output spectrum is characteristic of the material that comprises the tag. The intensity of the illuminance (light) emitted at least one of the wavelengths (e.g., about 680 nm) can be monitored to measure a decay time, as described below.

Preferably, the latent illuminance material is excited with light close to a single wavelength (e.g., about 660 nm). The latent irradiance emitted by the latent illuminance material can be at a single wavelength, or at a spectrum of wavelengths (e.g., between about 680 and about 800 nm). In the latter case, the signal used to determine the decay period (hereinafter also referred to as a decay time or time constant) is measured as the aggregate of the spectrum of wavelengths being detected by the sensor.

Figure 3B:
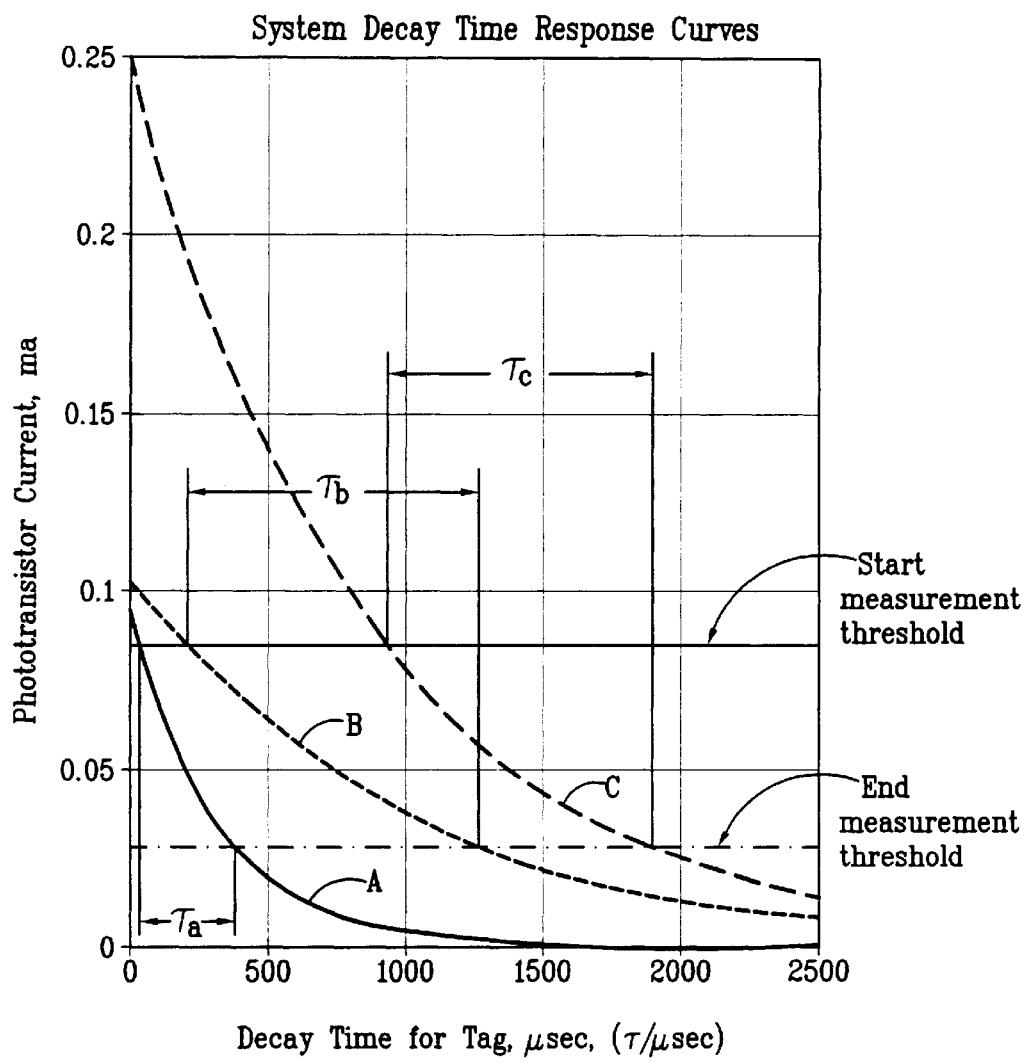
FIG. 3B is a diagram of exemplary decay rates for exemplary tag materials in accordance with the invention.

The tag will emit illuminance (light) in accordance with the output spectrum for a period of time after being illuminated with a light source. The decay time for the emitted illuminance ranges from sub-microseconds to several minutes, and preferably between about 50 $\mu$sec and about 3,000 $\mu$sec, depending on the material that is phosphorescing and the wavelengths that are being monitored. A decay time constant used to specify the tag is the time it takes for the latent irradiance to decay to some fraction or percentage, such as 37%, of its initial value. In accordance with a preferred embodiment, the decay in irradiance takes the form $e^{-t/(T/X)}$ where T is the decay time constant for a predetermined amount of decay, X is a predetermined constant that preferably ranges between about 0.36 and about 2.3, and t is elapsed time from when the charging LED is turned off, or the elapsed time for the decaying signal level to pass from a first predetermined magnitude or intensity level through a second lower level which fixed and predetermined, and is preferably a predetermined percentage below the first magnitude level, but can be a predetermined percentage below the initial value. For example, for a decay of about 30% of the initial latent illuminance, X is about 0.36. FIG. 3B illustrates this decay for three different exemplary tag materials, A, B, and C, as a graph of phototransistor current versus decay time for the tag. As described below, a phototransistor or photodiode are the preferred detectors used to detect the emitted illuminance from a tag.

Figure 3C:
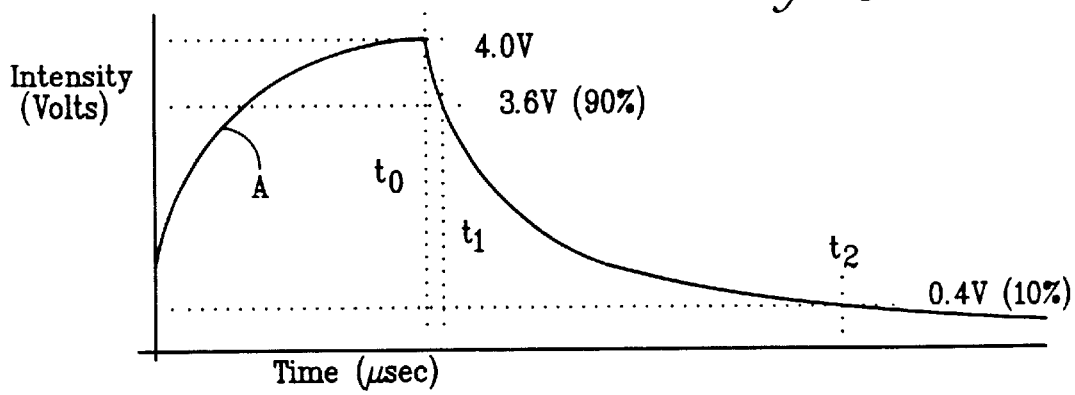
FIG. 3C is an exemplary decay pattern for a tag in accordance with the present invention.

FIG. 3C shows an exemplary decay pattern for a tag in accordance with the present invention. The intensity is measured for a predetermined wavelength. As the tag is being illuminated (charged) by the LED light source, it begins to emit illuminance, as indicated by line A. The LED light source is turned off at time to, and the tag thereafter emits latent illuminance from an initial peak value, such as about 4.0 volts, to a low value, ultimately approaching about 0 volts. The decay time is measured between two or more thresholds, such as between 90% and 10% of the initial value; i.e., the time between about 3.6 volts and 0.4 volts, or $t_2-t_1$. This decay from the initial 3.6 volt threshold level to a 0.4 volt threshold level illustrates an embodiment where about an 89% decay time is measured (100*(3.6−0.4)/3.6). The measured decay time is compared with a predetermined decay time to determine whether or not the data storage cartridge or disk that has been inserted in the disk drive is appropriate for use with the disk drive. If so, the read/write heads of the disk drive are then able to engage the disk without risk of damage. Moreover, the data storage cartridge can be identified as a particular type or generation, and the disk drive can engage it accordingly. Although the preferred embodiment is directed to an exponential decaying latent illuminance material, it is also appreciated that non-exponential optically decaying latent illuminance materials can also be used with the present invention.

In a preferred embodiment, the system measures the latent illuminance times between two pairs of thresholds in order to ensure greater accuracy in authentication and validation and to eliminate a linear response that emulates the exponential decay. Each pair of thresholds is preferably the same percentage decrease in intensity. In one example, a first pair of thresholds is 90% and 60%, or the time it takes the latent illuminance intensity to decrease from 90% to 60%, which is a decrease in intensity of 33% or one-third. The second exemplary pair of thresholds is 60% and 40%, which is also a decrease in intensity of 33% or one third. The irradiant decay is timed between the first and second thresholds, and the second and third thresholds. The time it takes for the illuminance to decrease between the first set of thresholds should be approximately equal to the time it takes the illuminance to decrease between the second set of thresholds because the percentage decrease in intensity is the same between the two pairs of thresholds. With an exponential decay, the times are approximately equal. If these two times are approximately equal, then it is known that the detected light is being emitted from something having a decay time similar to the authentic tag. For further validation purposes, the time can be compared to a predetermined time to further ensure that the tag is authentic or valid. Thus, a means for verifying that the decay rate being measured is truly of exponential form and not linear is provided.

It should be noted that the two pairs of thresholds do not have to be equally spaced in percentage decline in intensity, but can be chosen to have any predetermined level of intensity change. In such a case, the decay times between thresholds can still be compared to each other for an appropriate ratio, and/or the decay times can be compared to a predetermined time or times to authenticate or validate the data storage cartridge. Moreover, additional thresholds and measurements can be added for even further authentication and validation accuracy. Preferably, a value below the initial illuminance value is used as a starting point, and a value above zero is used as an ending point, in order to reduce or eliminate the effects of tag age and manufacturing tolerances.

Any material or combination of materials exhibiting latent illuminance properties or characteristics can be used as the latent illuminance material in accordance with the present invention, including any phosphor or combination or blend of phosphors. Preferred phosphors include rare-earth phosphors including oxides, oxysulfides, silicates, and alumites as well as other photolument materials and compounds. There are many combinational possibilities for photoluminent materials. Most preferably, a phosphor tag for use in accordance with the present invention is manufactured by Sarnoff Corporation, Princeton, N.J.

The tag is preferably a pressure sensitive adhesive (PSA) sticker. The desired phosphorescent material or compound is preferably suspended in an optically clear binder which is coated/printed on the sticker substrate (e.g., white vinyl). PSA with a protective liner is applied to the back side of the sticker substrate.

The compound can alternatively be used as a plastic filler for injection molded parts/tags or blended with inks for printing, or applied via suspension in an adhesive compound such as UV curable epoxy, or using any other suitable method. Parts requiring identification and discrimination can be either molded, printed onto, or tagged with a phosphorescent material or compound.

It is desirable that with ordinary handling and abrasion the tag will not flake, peel or otherwise be damaged in a manner to adversely affect its performance or generate debris which could adversely affect a disk drive's performance. Moreover, preferably, the tags are operational from about −20 to about 65° C. (about −4 to about 149° F.) and have a functional life of at least 15 years. Thus, inorganic phosphors are preferred as the phosphorescent material.

The latent illuminance emitted from the tag is sensed by a photodetector to provide the tag type discrimination and desirably has as high a conversion efficiency as possible. In other words, the latent illuminance should have as high a latent irradiance conversion efficiency (LICE) as possible. LICE is the percentage of excitation light hitting the tag that is converted to latent illuminance/light. Moreover, the latent illuminance is preferably irradiated from the tag in a diffuse, spherical manner, equal in all directions.

Figure 4A:
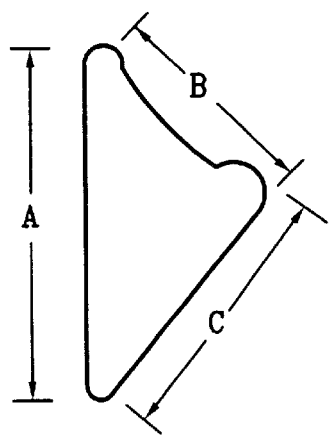
FIGS. 4A and 4B show a plan view and an exploded perspective view, respectively, of one embodiment of the invention.
Figure 4B:
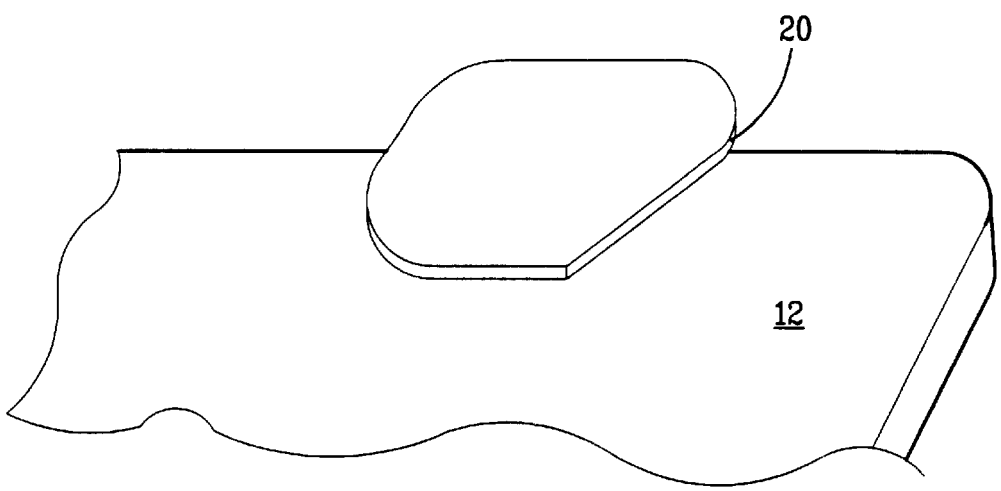

The tag can be any size or shape that fits on the disk cartridge, with the thickness, or ink thickness if printed, preferably less than about 0.5 mm and a thickness tolerance of about ±0.05 mm. FIG. 4A shows the preferred physical dimensions of the tag implementation for a cartridge application, with dimensions: A equals approximately 1.2 cm, B equals approximately 0.9 cm, and C equals approximately 1.0 cm. The sheet tolerance for the tag illustrated in FIG. 4A is about ±0.13 mm. FIG. 4B shows an exploded perspective view of the tag 20 on the outer casing 12 of the disk cartridge.

Figure 5:
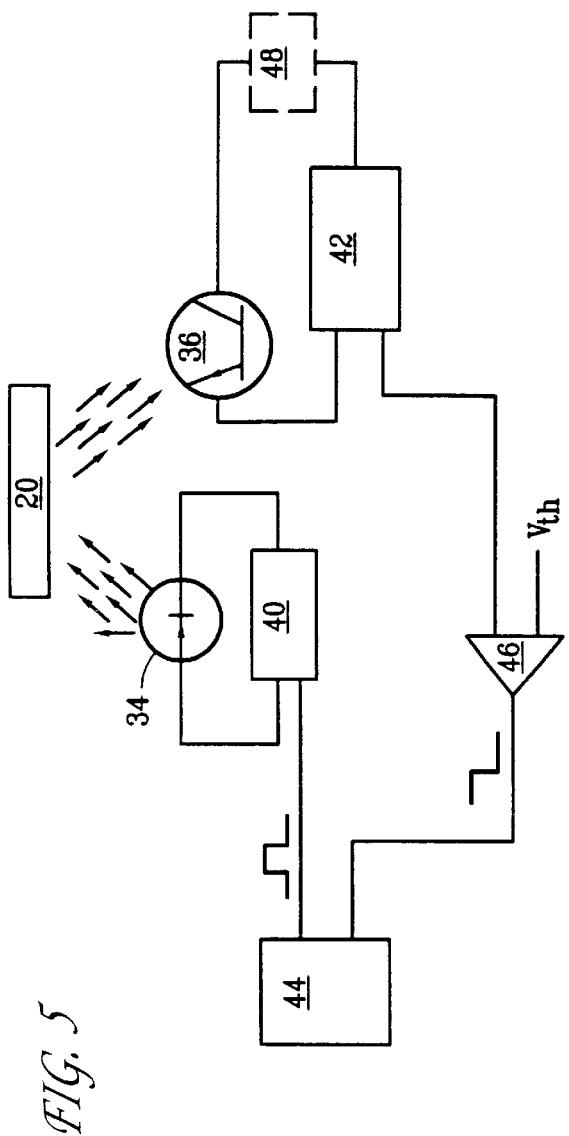
FIG. 5 shows a block diagram of an exemplary system in accordance with the present invention.

In a preferred embodiment, the disk drive has an emitter/detector pair that is used for interrogation of the latent illuminance tag. FIG. 5 shows a block diagram of an exemplary system in accordance with the present invention. A light source 34, preferably an LED, illuminates a latent illuminance tag 20 and is then turned off. The LED 34 is driven by LED switching and current limiting electronics 40, and a microprocessor 44 which sends pulse commands to the electronics 40. The tag 20 emits illuminance, having an initial intensity value at a particular wavelength or wavelengths, which is detected by a detector 36, preferably a phototransistor or photodiode. Preferably, the detector 36 waits a predetermined time, such as about 10 $\mu$sec, after the LED is turned off before beginning measurement of the latent illuminance at the particular wavelength(s) from the tag. Gain, preferably 100X, is applied to the output of the phototransistor or photodiode 36 by a gain stage 42. The output of the gain stage 42 is provided to a comparator 46 which compares the emitted illuminance with a threshold Vth. The results of the comparison are provided to the microprocessor 44 which measures the timing, determines the decay rate or time, and identifies the disk cartridge for validation, as described above. Element 48 contains optional filters that are described below with respect to further embodiments.

Figure 6A:
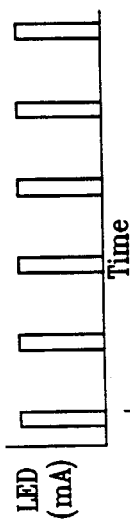
FIGS. 6A and 6B show the time domain operation of an exemplary system in accordance with the present invention.
Figure 6B:
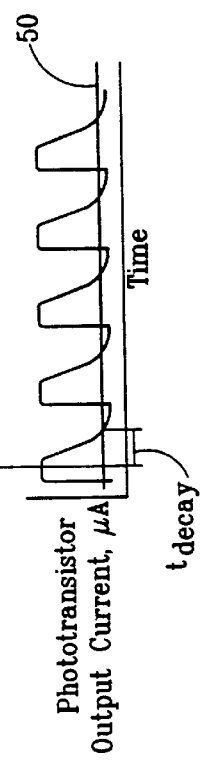

More particularly, when a data storage cartridge is inserted into a disk drive, the light source 34, preferably an LED, emits a short intense pulse of light. The light can be one pulse or a continuous cycle of pulses. Moreover, in another exemplary embodiment, the detection circuitry optically pumps the phosphorescent tag with the light source and measures and compares a phase lag between the drive signal and the decay illuminance. This provides a measure of the decay time constant. FIGS. 6A and 6B show an exemplary LED duty cycle and its corresponding latent illuminance decay profile at a phototransistor or photodiode output, respectively, for a pulsed LED. The bounded decay time, $t_{decay}$, provides the information that is desirably used to discriminate between a plurality of tags. Line 50 shows the threshold for decay time detection.

LEDs are capable of handling large current surges for short periods to generate bright flashes of light. The outputted LED light illuminates the latent illuminance tag 20 and thereby excites atoms or ions which emit light as they decay to lower energy levels. The phosphor type materials used in the preferred latent illuminance tag 20 fluoresce for a period of time after the LED 34 is turned off. The photonic sensor 36 is in close proximity to the LED 34. This sensor 36 is initially saturated by the emitted light from the tag 20, preferably significantly above the high detection threshold level such that component life and manufacturing tolerances are accommodated (i.e., do not significantly affect the performance of the device). Once the LED 34 is turned off, the disk drive microprocessor 44 or a functionally similar system monitors the output of the photonic sensor 36 and, in an exemplary embodiment, determines the decay time required for the latent illuminance or phosphorescence to fall through two predetermined thresholds, thus establishing the desired decay rate. The decay time measured by the drive microprocessor 44 provides information by which the drive can determine which generation or type of cartridge has been inserted. It is noted that alternate embodiments establish a decay rate to identify the cartridge based on the time required for the latent illuminance or phosphorescence to fall below a predetermined threshold, or fall through multiple thresholds, such as two sets of two predetermined thresholds.

The thresholds are preferably fixed, predetermined values, but it is understood that the microprocessor could measure the initial intensity value of the latent illuminance and, based on the initial value, determine the thresholds and expected decay times. Moreover, the thresholds could be fixed intensity values (e.g., about 3.0 volts and about 1.0 volts) determined independently, and not determined responsive to a percentage of the initial value or any other threshold.

As described, the emitter is a light source, preferably an LED, and the detector is a photosensor or photodetector, preferably a phototransistor or photodiode. FIGS. 7A to 7C show the layout of a suitable emitter/detector pair 32 which includes LED 34 and phototransistor or photodiode 36. The tag 20 (shown in FIG. 5) is illuminated with the LED 34, and the output of the phototransistor or photodiode 36 is sampled at regular time intervals to determine the decay signature or time constant for the decay.

The tag can be illuminated with a single color LED or multiple colors (i.e., two or more colors at the same time), depending on the composition of the latent illuminance material compound in the latent illuminance tag. For example, in one embodiment, the emitter is a three color LED which illuminates the latent illuminance tag with three colors, for example, red (630 nm), green (560 nm) and orange (605 nm) wavelengths because the tag comprises at least one material, such as phosphor, responsive to one of these wavelengths, and may be a phosphor compound comprising more than one material that is responsive to these wavelengths. The decay signature, or signatures in combination, are used to identify the cartridge as having a valid latent illuminance tag. It should be noted that there are numerous wavelengths of LEDs from the blue to the near-IR in the photonic spectrum that are technologically and economically feasible.

The addition of more than one emitter/detector pair allows for emission and detection of multiple wavelengths or colors from the latent illuminance tag, thereby providing cartridge type discrimination. FIGS. 8A to 8D depict an emitter/detector system which includes two detectors 36 and two emitters 34. FIG. 8D depicts the electrical components with the legends E for emitter, C for collector, A for anode, and K for cathode. The "emitter/detector system" includes two light detectors (phototransistors and/or photodiodes) 36 which have different color filtering transmissive windows in front of them and two LED light sources of differing wavelength.

Figure 9A:
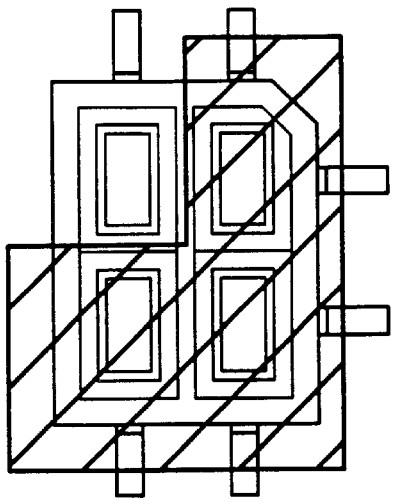
FIGS. 9A to 9D show the discriminatable illuminance states using a LED/detector system such as that of FIGS. 8A to 8D.
Figure 9B:
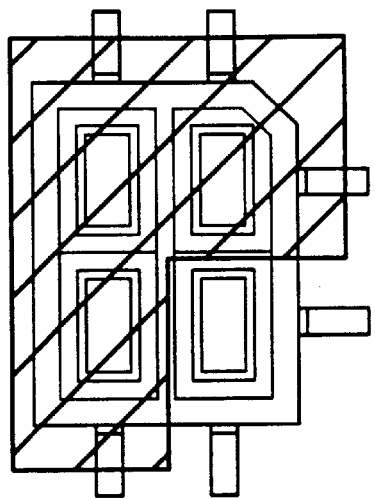
Figure 9C:
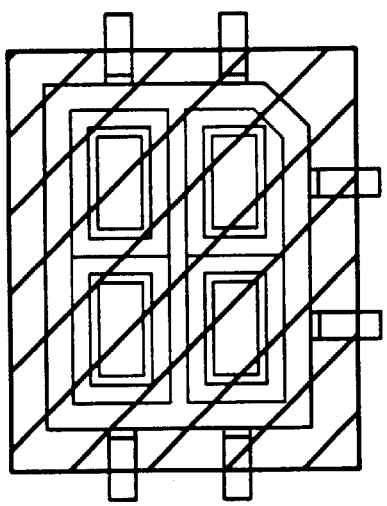
Figure 9D:
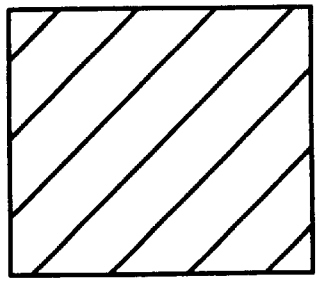

FIGS. 9A to 9D illustrate the three possible detectable or discriminatable states using the two detectors. It should be noted that the detectors can be oriented in any configuration. State 1 is shown in FIG. 9A, state 2 in FIG. 9B and state 3 in FIG. 9C. FIG. 9D shows the legend for the emitters and detectors that are active in FIGS. 9A to 9C. An example of the application of this three state system would be in a future higher capacity ZIP drive. "State 1" would alert to the insertion of a ZIP 100 cartridge, "State 2" would alert to the insertion of a ZIP 200+ cartridge, and "State 3" would alert to the insertion of a third type of cartridge.

Addition of a third detector element and a third emitter allows for the detection and discrimination of seven possible states based on material emission wavelength. Any number of multiple arrayed detectors and emitters provide an exponentially increasing number of discriminatable states based on material emission wavelength. Taking ratiometric measurements between the sensors allows for even more detectable states and improved discrimination.

Figure 10A:
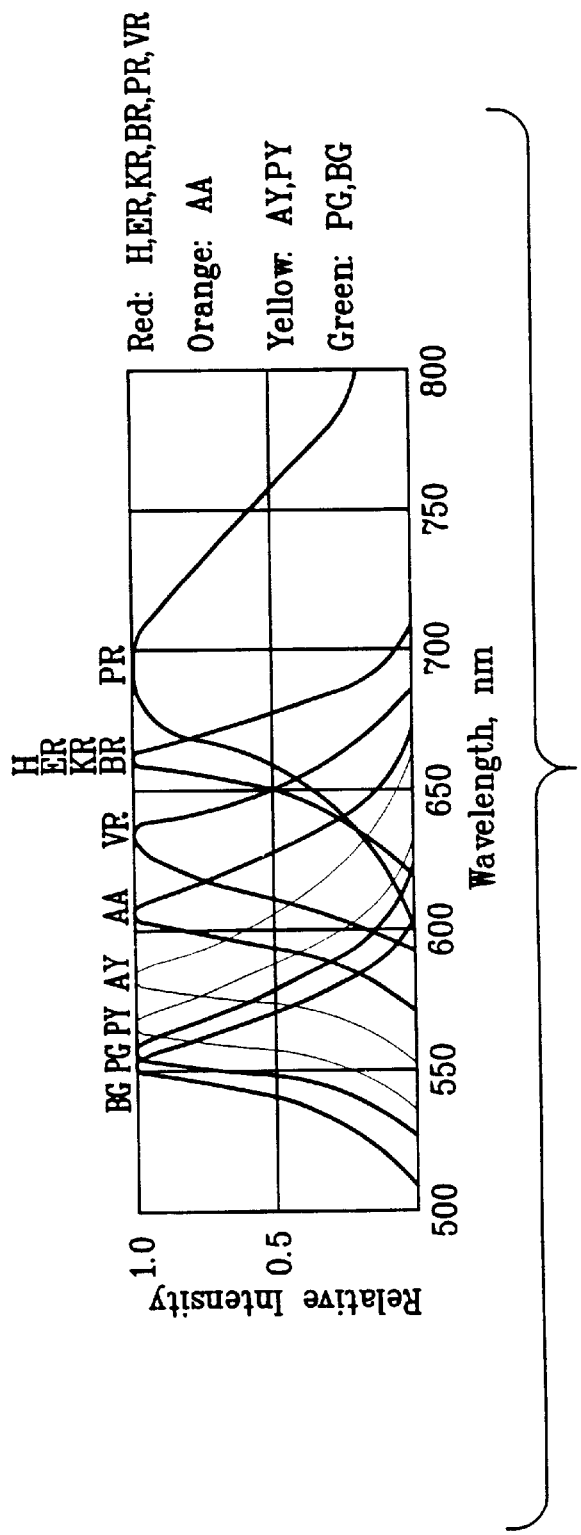
FIGS. 10A and 10B show spectral distribution for typical near-IR LEDs and visible LEDs, respectively.
Figure 10B:
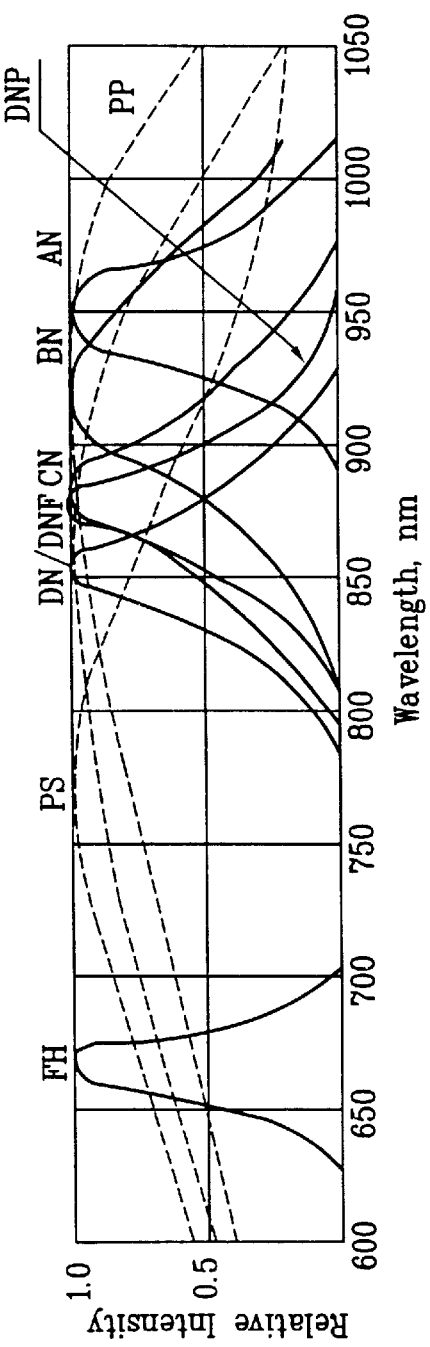

The excitation wavelength for the latent illuminance tag is preferably a standard LED emitting wavelength. Exemplary center wavelengths and their FWHM spectral bandwidths in order of preference are as follows: 670 nm (30 nm), 605 nm (30 nm), 580 nm (30 nm), and 560 nm (30 nm). FIGS. 10A and 10B show spectral distribution for typical near-IR LEDs and visible LEDs, respectively, which are also possible excitation sources.

The distance between the tag and the excitation light source is preferably in the range between about 1 mm and about 15 mm.

In accordance with the present invention, it is desirable to minimize the spin-up time for the disk drive. Minimization of the spin-up time dictates the time duration of excitation irradiance and light source current draw limits. If the cartridge type verification is to take place prior to drive spin-up, the current through the device can be relatively high, but the duration is preferably short to minimize protraction of spin-up time. Alternatively, the excitation and detection process could occur during motor spin-up which takes about a second; however, due to the high current demands of this process, the available current for tag excitation is limited.

Any light source can be used that puts out light sufficient to energize the latent illuminance tag or marker and can be quickly turned off (e.g., an LED having 30 ma maximum at 50% duty cycle (periods<1 second) or power equivalents).

Low cost physically compact commercially available packages which include both an LED irradiance source and a phototransistor or photodiode (photonic sensor) such as the Sharp GP2S27 Photointerrupter or the Siemens SFH9101 Light Reflection Switch can be used as excitation/detection apparatus for the present invention. The LED wavelength and window optical potting (spectral filter characteristics) of these devices can be customized for use with the embodiments of the present invention.

In an exemplary embodiment, a flood LED (FLED) is the preferred light source for charging the tag. A preferred commercially available FLED is product number TLRA 1005 manufactured by Toshiba which is a very bright 660 nm light source. The FLED is high power and has the ability to charge the latent illuminance tag beyond what could be done with an ordinary LED, such as one found in a commercially available photointerrupter. The FLED prevents the problem of the low signal response from the latent illuminance material and high noise content in the detection circuit.

Preferably, the FLED has a very narrow emission band matching the absorption band of the latent illuminance/irradiance tag.

The FLED also has a narrow beam divergence. This narrowly diverging beam significantly reduces the amount of reflected light from the platform elements on which a cartridge is disposed in a disk drive. The LED source in the photointerrupter is a widely diverging light source. The FLED is a very intense light source. It is configured to send out between about 800 and about 1000 mcd of light to a small area on the tag. The LED source in the photointerrupter is on the order of about 10 to about 15 mcd and spreads light over a much larger area.

Thus, in detection of a latent illuminance tag, a narrow well matched frequency band emission is desirable to the function of the latent illuminance material and system circuitry.

A series of different tags (e.g., 10 to 20) can be formulated for a particular user such as a software manufacturer, with each formulation having different latent illuminance materials and therefore different photoluminance decay characteristics. The decomposition and reverse engineering required to reformulate a latent illuminance tag of the present invention is difficult. In the event that such a security break does occur, however, the software manufacturer can switch to another tag having a different signature.

These other signatures would be programmed or encrypted into the drive's firmware as a recognizable latent illuminance tag. Thus, the present invention can be used by a software manufacturer to identify its program disks as being authentic, so that only authorized users could use the software stored on those disks. Alternatively, the latent illuminance/irradiance tags' detection alone or in conjunction with the data store on the cartridge can act as a key mechanism to allow authorized use of the proprietary software. If the appropriate cartridge is not inserted, access to the use of the software is denied.

Figure 11:
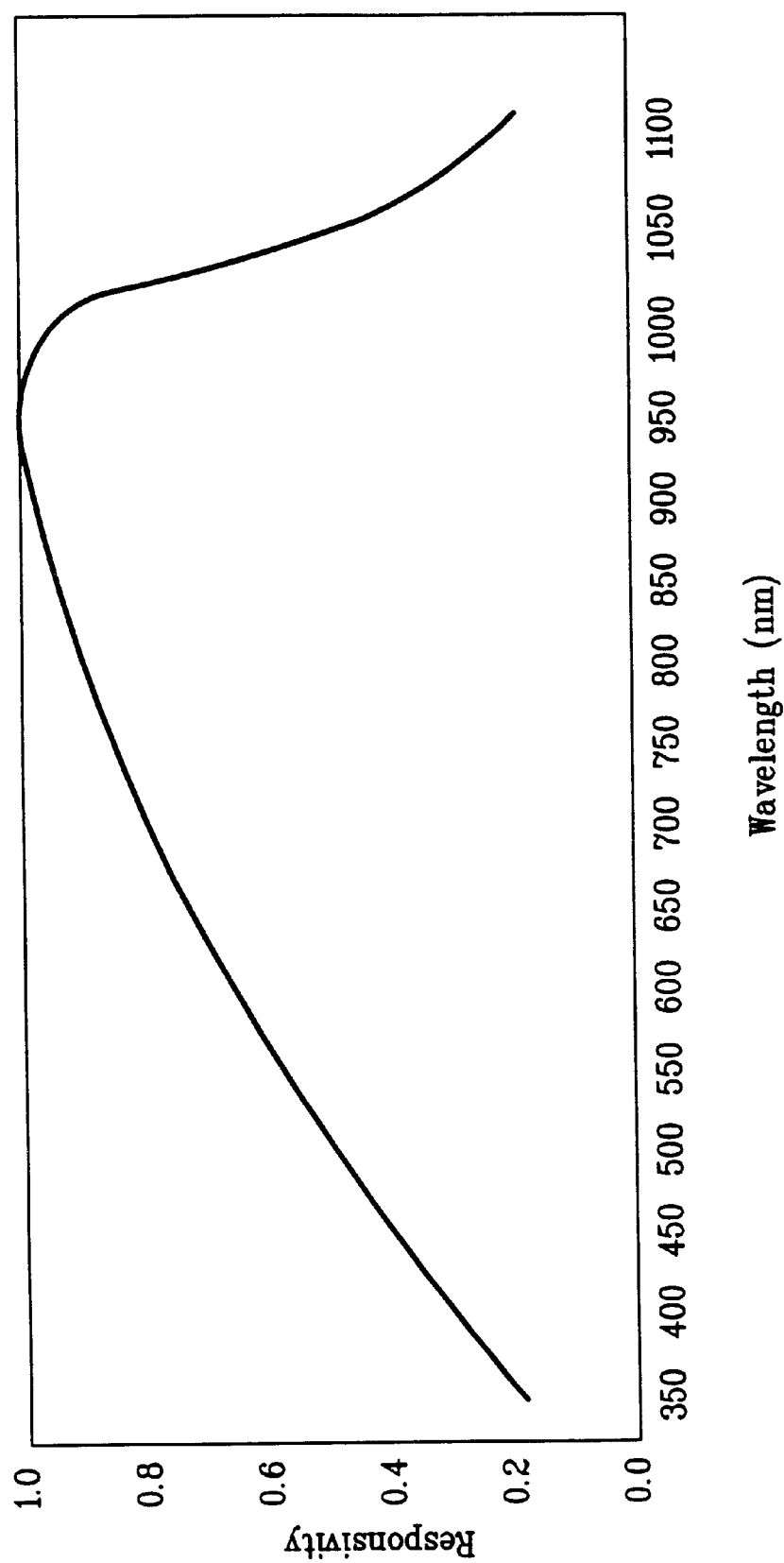
FIG. 11 shows the spectral responsivity (normalized) of a conventional silicon photosensor.

As stated above, it is most preferred that the latent illuminance wavelength be shifted from that of the emitted source (e.g., the source emits at near-IR wavelengths such as about 760 nm). Secondarily, when using a series of different tags, it is preferred that all the tag types' latent illuminance wavelength spectra be within the responsivity window of silicon (about 450 nm to about 1050 nm) and preferably nearer to the peak response of silicon (about 950 nm). At a minimum, the latent illuminance wavelength of the tag types preferably are within the response spectrum of silicon (about 450 nm to about 1050 nm). FIG. 11 shows the spectral responsivity (normalized) of a typical silicon photosensor.

The time constant for different generations of cartridges can be produced by using different material compounds which inherently have different latent illuminance decay rates due to their photoreactive chemistry. An appropriate amount is a large enough increase in the time constant such that the system tolerances can be allowed for in the system and do not cause overlap in the time constant discrimination windows for various cartridge generations. Preferably, the system is dependent on the exponential decay characteristic of the latent illuminance material and does not vary dependent on the gain or frequency response of the system.

In one embodiment of the present invention, at least three phosphorescent compounds with differing latent illuminance decay constants are used to identify three generations of a product. Table 1 specifies the decay time constant for the three exemplary types of tags. The table also provides numerical time values for the detection window for each type of tag. This table is not intended to be an absolute requirement for materials, but rather an example of a workable set of time constants for the exemplary family of three compounds. It is further preferred that 1) the shortest time constant of the family of compounds is at least about 150 $\mu$sec, 2) the longest time constant is less than about 100,000 $\mu$sec. 3) the three tags' "system time window of discrimination" (Tmax−Tmin) for the detection system do not overlap, and 4) tolerance on the decay time constant is about +/−5%.

TABLE 1

| Tag No. | "T" Decay time constant (μsec) | "T" tolerance (± %) | Tmin (μsec) | Tmax (μsec) | ΔT window (μsec) |
|---|---|---|---|---|---|
| 1 | 150 | 5 | 120 | 345 | 225 |
| 2 | 500 | 5 | 400 | 1000 | 600 |
| 3 | 1300 | 5 | 1050 | 2400 | 1350 |

A series of phosphorescent compounds is used which produces a latent illuminance after being illuminated by an LED source having a visible to near-IR wavelength. This family of compounds preferably has a different decay time constant for the latent illuminescence for each of the members of the family. The difference in the decay times is used as a discriminator between a particular member of the family and others and between the particular member and other purely passive light reflectors.

One embodiment in accordance with the present invention incorporates a filter to spectrally filter out the illuminating wavelength at the aperture of the photonic sensor and only transmit the wavelength(s) that are to be emitted by the phosphorescent effect of the tag. This reduces the recovery time required by the photonic sensor to come out of saturation from reflected illuminating wavelengths and makes the system less sensitive to ambient light sources.

In accordance with another aspect of the present invention, in embodiments in which a phototransistor or photodiode is used in the disk drive as a detector, a filter is placed on the phototransistor or photodiode in the disk drive so that the latent illuminance material is used to convert light from the visible spectrum (short wavelength light) to the infrared spectrum (long wavelength light). For example, a dyed potting compound, similar to those used to filter the light coming to the remote control input window of a television set, can be used which absorbs light below a certain wavelength, e.g., 680 nm. It is desirable to implement this type of system to eliminate noise detected by the phototransistor or photodiode in the detection system. In other words, the present invention prevents the problem of DC noise bias in a detection system for visible light.

The phototransistor or photodiode has a very broad wavelength excitation range which makes it more difficult to detect specific responses. A filter material to remove the visible (short) wavelength light is placed on the phototransistor or photodiode. This helps absorb any reflected light that results from a short wavelength source used to charge the latent illuminance material (i.e., the reflected light is the light that is not absorbed and converted into long wavelength light). If the latent illuminance material does not convert light from the visible to the infrared spectrum, the light will be absorbed by the filter, thereby preventing the creation of DC bias in the detection circuitry.

Therefore, the latent illuminance material is charged by light in the visible spectrum. The latent illuminance material emits in the infrared spectrum. The phototransistor or photodiode filters the reflected "charging light" and detects only the emitted light from the latent illuminance material in the infrared spectrum. Thus, the phototransistor or photodiode response is improved by minimizing or reducing the emitter load or impedance on the phototransistor or photodiode, thereby improving the aggregate system response to a short time constant latent illuminance material (i.e., a latent illuminance material having a time constant between about 50 μsec and about 3,000 μsec).

In an alternate embodiment, an absorbing material such as a rare earth element or a dye is disposed within the tag to absorb undesired light at certain wavelength or wavelengths. This is desirable to capture light emitted from the light source that would not otherwise be absorbed by the tag. If not absorbed by the tag, this unwanted light would reflect off the tag and be detected by the detector at a certain wavelength or wavelengths, thereby leading to an incorrect identification of the object. For example, a disk drive may interpret light having a wavelength in the range between about 680 and about 800 nm as belonging to the tag associated with a first type of disk, and may interpret light having a wavelength of about 950 nm as belonging to the tag associated with a second type of disk. An absorbing material, such as a rare earth element, can be incorporated into the tag of the first type of disk to absorb light that would not otherwise be absorbed and may reflect at about 950 nm to ensure that the drive will not incorrectly identify the first type of disk as being of the second type.

Figure 12:
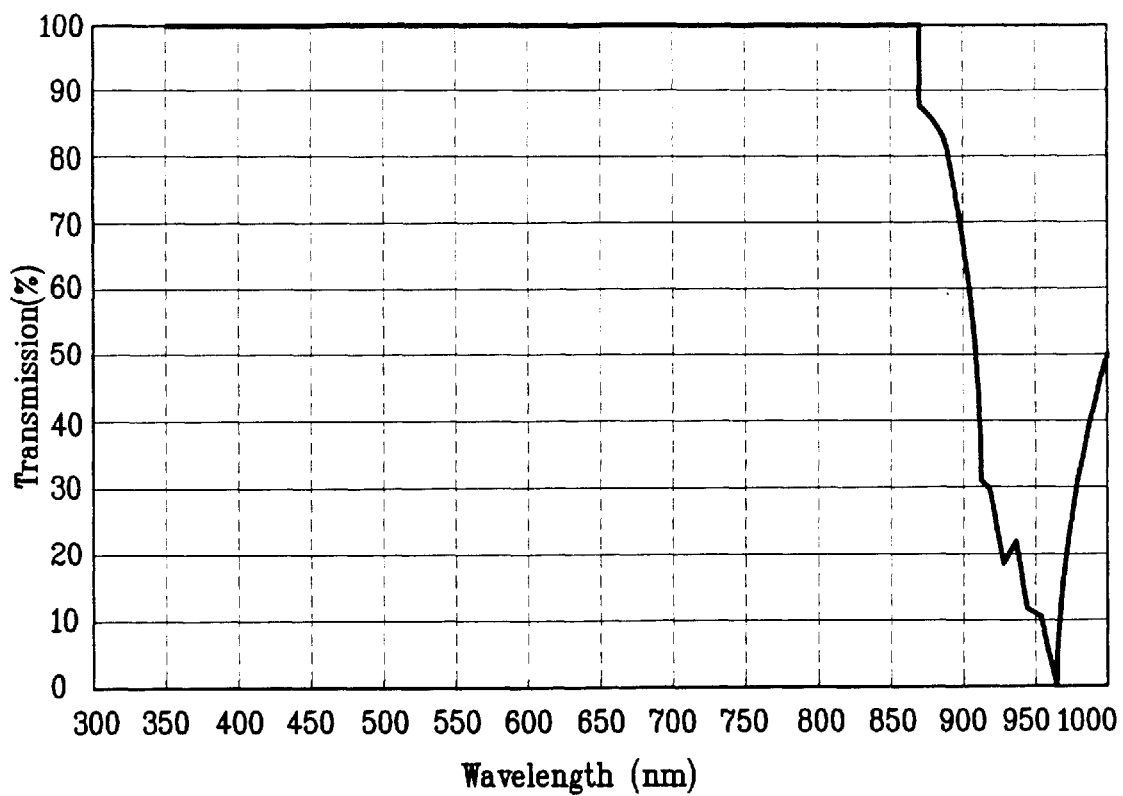
FIG. 12 shows a typical transmission curve for a ytterbium oxide filter for use in the present invention.

A preferred absorbing material for the latent illuminance tag is ytterbium oxide which has a typical transmission curve as shown in FIG. 12 when embodied in 19% ytterbium oxide phosphate glass. Ytterbium is a rare earth metal which absorbs light having a wavelength of about 950 nm. The absorbed light is turned into heat which dissipates. The filter material can be coated onto the tag or blended with the latent illuminance material. The filter absorbs light at a particular wavelength so that false readings are prevented. Furthermore, the filter material, when coated onto the tag, provides increased abrasion resistance for the tag.

Ytterbium has a very narrow absorption band (about 910 to about 990 nm) which is desirable. The phosphor material re-emits light in the 990–1200 nm range or the 700–910 nm range. If the filter material absorbed light over a very broad range, it would absorb a great deal of the light produced by the phosphor. This would make the cartridge detection difficult.

Preferably, the filter material is carried in a very matte finish ink binder.

Without a tough binder overcoat, the phosphor material could easily be scraped away. The matte finish reduces reflectivity by increasing the light dispersion. The binder for the filter material is also preferably flexible so that the tag does not crack or flake during the assembly process.

Another feature in accordance with the present invention is the use of a filter, preferably a high pass electronic filter or a notch filter, on the detection circuit to filter out ambient light at both DC (sunlight) and 50–60 Hz (electric lights). This prevents noise from affecting the decay signal. Because decay times for the embodiments described above are in on the order of approximately hundreds of microseconds (faster than 1 KHz), this type of filtering is straightforward and low cost. Moreover, the excitation light source, the photonic sensor, and the latent illuminance tag detection environment are preferably shielded from ambient light. The above described filters can be incorporated into the system diagram of FIG. 5 as optional element 48.

In an alternate embodiment in accordance with the present invention, instead of using the decay time or rate of the material in the tag to identify an object, the spectral content or characteristics of the tag are used to identify or authenticate the object that the tag is attached to (i.e., latent wavelength discrimination of the tag is used to identify the object). In other words, the disk drive, instead of measuring or detecting the illuminance and measuring a decay rate or time, detects the spectral content or characteristics of the light emitted from the tag, such as those shown in FIG. 3A. The disk drive then compares the spectral content or characteristics with predetermined or predefined spectral content or characteristics. A match identifies the tag and hence the object it is attached to. Accordingly, any of the tags described in the above embodiments can be used to identify an object using the spectral content or characteristics of the tag instead of the decay rate or time of the tag.

Figure 13:
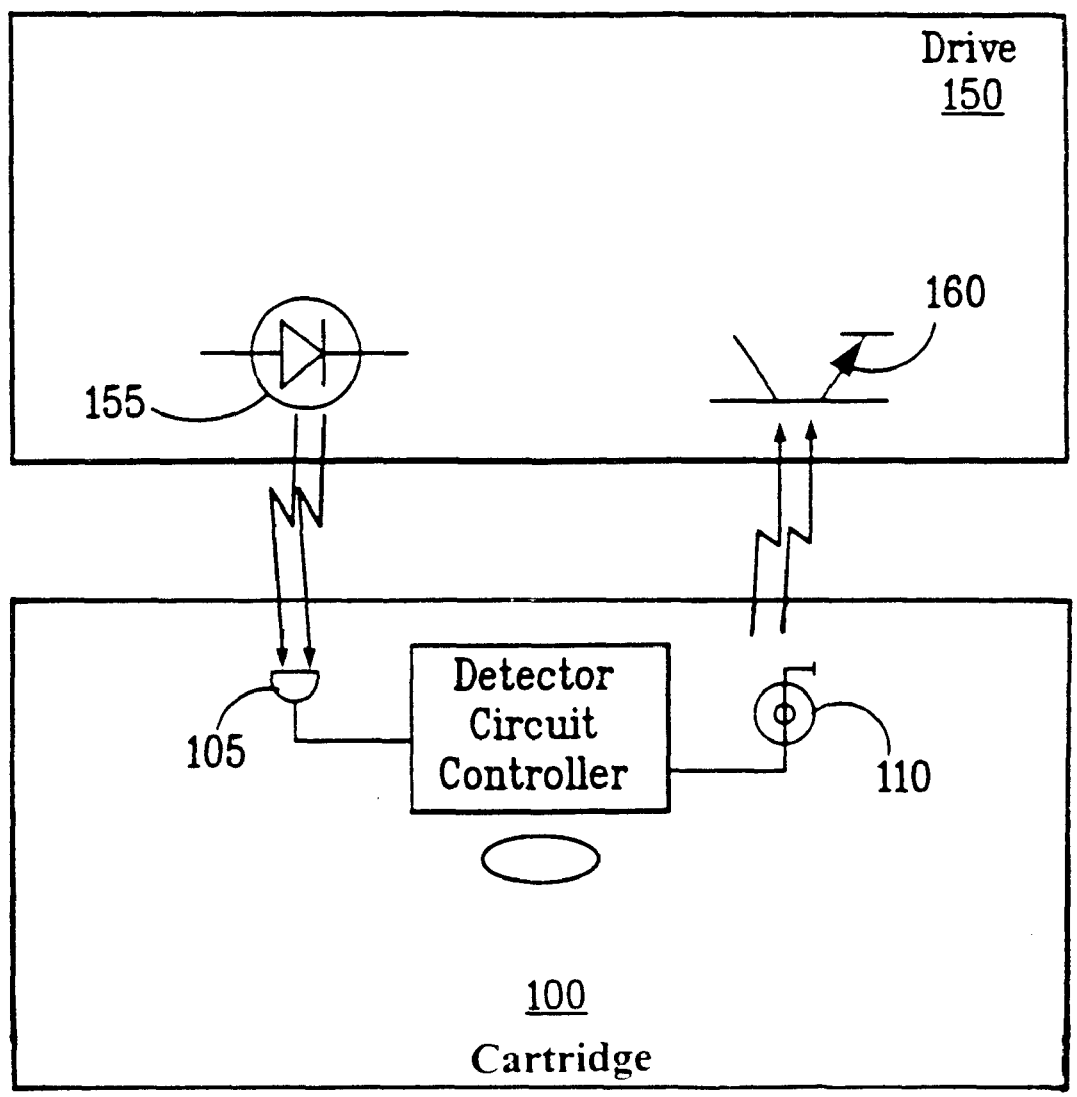
FIG. 13 shows a block diagram of a further exemplary system in accordance with the present invention.

In an alternate embodiment, the action of a latent illuminance tag as described in the above embodiments is simulated by a circuit implemented on a disk or data cartridge as shown in FIG. 13. A photodetector circuit 105 on a disk or data cartridge 100 detects irradiance from a light source 155, such as an LED, on a disk drive 150 and activates a light source 110 such as an LED within the data cartridge 100. The light source 110 emits either a pulse of light set to the detection time constant of the drive detector circuitry 160, or the source 110 outputs an exponentially decaying light that simulates the latent illuminance material used in a latent illuminance tag. In other words, the cartridge LED 110 flashes at the appropriate time for the appropriate duration at the appropriate amplitude(s). Or, when triggered by the drive, the cartridge LED 110 decays from a fixed amplitude to another fixed amplitude over a specific time. Thus, the drive detector circuit 160 will identify the data cartridge to be of the same type as that equipped with the simulated latent illuminance tag and cause the drive to accept the cartridge. The light detector 105, detector circuit controller 107, and light source 110 can be implemented on a single integrated circuit (IC). The IC could be powered by a battery on the data cartridge 100 or by the luminance of the drive 150. It is noted that by appropriate multiple light sources and/or filtering, any and all latent illuminance material configurations described in the above embodiments can be simulated in this manner.

The present invention can be used to identify read only disks, write once disks, and disks having particular applications, such as photodisks for digital camera applications, global positioning or map disks, and book disks.

The tags of the present invention are less complex and more economical to manufacture than other types of markers. The tags are highly repeatable and thus provides a manufacturing advantage.

Although the present invention has been described herein with respect to cartridge detection, it can be used in any object detection or discrimination apparatus or application, such as anti-counterfeiting apparatus and applications.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A data storage drive comprising:
   a source of irradiance;
   a detector of irradiance; and
   means for enabling said drive, said detector being connected to enable said means for enabling said drive when said detected irradiance indicates a predetermined decay time.

2. The data storage drive of claim 1, wherein said source of irradiance is a light emitting diode (LED).

3. The data storage drive of claim 2, wherein said LED is a flood LED.

4. The data storage drive of claim 1, wherein said detector is one of a phototransistor and a photodiode.

5. The data storage drive of claim 1, wherein said drive further comprises monitoring means for monitoring the output of said detector and determining a decay time of said detected irradiance, said detector connected to enable said drive when said decay time substantially equals said predetermined decay time.

6. The data storage drive of claim 5, wherein said monitoring means comprises a microprocessor.

7. The data storage drive of claim 1, further comprising a filter for filtering irradiance of at least one predetermined wavelength from entering said detector.

8. A data storage drive comprising:
   a source of irradiance;
   a detector of irradiance; and
   means for enabling said drive,
   said data storage drive adapted to receive a cartridge comprising:
      a body;
      a data storage medium in said body; and
      a marker on said body, said marker being a latent illuminance material which receives irradiance from said source and emits irradiance toward said detector for detection, said detector being connected to enable said means for enabling said drive when said detected irradiance indicates a predetermined decay time.

9. The data storage drive of claim 8, wherein said source of irradiance is a light emitting diode (LED).

10. The data storage drive of claim 9, wherein said LED is a flood LED.

11. The data storage drive of claim 8, wherein said detector is one of a is phototransistor and a photodiode.

12. The data storage drive of claim 8, wherein said drive further comprises monitoring means for monitoring the output of said detector and determining a decay time of said detected irradiance, said detector connected to enable said drive when said decay time substantially equals said predetermined decay time.

13. The data storage drive of claim 12, wherein said monitoring means comprises a microprocessor.

14. The data storage drive of claim 8, further comprising a filter for filtering irradiance of at least one predetermined wavelength from entering said detector.

15. The data storage drive of claim 8, further comprising:
   a plurality of sources of irradiance to emit irradiance at a first plurality of wavelengths; and
   a plurality of detectors of irradiance to detect irradiance at a second plurality of wavelengths, whereby detection of particular ones of said second plurality of wavelengths identifies a type of cartridge.

16. The combination of a data storage drive and a cartridge for said drive, said drive comprising:
   a source of irradiance at an irradiance wavelength;
   a detector of irradiance; and
   means for enabling said drive,
   said cartridge comprising:
      a body;
      a data storage medium in said body; and
      a marker on said body, said marker being a latent illuminance material which receives irradiance from said source and emits irradiance toward said detector for detection,
      wherein said detector is connected to enable said means for enabling said drive when said detected irradiance indicates a predetermined decay time.

17. The combination of claim 16, wherein said source of irradiance is a light emitting diode (LED).

18. The combination of claim 17, wherein said LED is a flood LED.

19. The combination of claim 16, wherein said detector is one of a phototransistor and a photodiode.

20. The combination of claim 16, wherein said drive further comprises monitoring means for monitoring the output of said detector and determining a decay time of said detected irradiance, said detector connected to enable said drive when said decay time substantially equals said predetermined decay time.

21. The combination of claim 16, further comprising a filter for filtering irradiance of at least one predetermined wavelength band from entering said detector.

22. The combination of claim 16, wherein said marker is an indicator of whether said cartridge is correct and compatible for use in said drive.

23. The combination of claim 16, further comprising:
a plurality of sources of irradiance to emit irradiance at a first plurality of wavelengths; and
a plurality of detectors of irradiance to detect irradiance at a second plurality of wavelengths, whereby detection of particular ones of said second plurality of wavelengths identifies a type of cartridge.

24. The combination of claim 23, wherein ratiometric measurements on said second plurality of wavelengths identify a type of cartridge.

25. The combination of claim 16, wherein said marker has a latent illuminance wavelength spectrum in the range between about 450 nm and about 1050 nm.

26. The combination of claim 25, wherein said marker has a latent illuminance wavelength spectrum in the range between about 680 nm and about 800 nm.

27. The combination of claim 25, wherein said irradiance wavelength is outside of said latent illuminance wavelength spectrum.

28. The combination of claim 16, wherein said latent illuminance material comprises a phosphorescent material.

29. The combination of claim 28, wherein said phosphorescent material comprises a rare earth phosphor.

30. The combination of claim 28, wherein said phosphorescent material comprises one of a Stokes phosphor and an anti-Stokes phosphor.

31. The combination of claim 16, wherein said latent illuminance material has a decay time which is used to identify said cartridge.

32. The combination of claim 31, wherein said decay time is in the range between about 50 $\mu$sec and about 3,000 $\mu$sec.

33. The combination of claim 31, wherein said decay time is an amount of time for said irradiance emitted from said marker to decay to a predetermined intensity value.

34. The combination of claim 31, wherein said decay time is an amount of time for said irradiance emitted from said marker to decay from a first intensity value to a second intensity value.

35. The combination of claim 16, wherein said irradiance emitted from said marker has an intensity that decays one of exponentially and as the sum of a plurality of differently weighted exponential decays.

36. The combination of claim 35, wherein said intensity of said irradiance decays according to $e^{-(t/(T/X))}$, where T is a decay time constant for a predetermined amount of decay, X is a predetermined constant, and t is a time that has elapsed from when said source of irradiance stops providing said irradiance.

37. The combination of claim 16, wherein said latent illuminance material is one of coated on a pressure sensitive sticker substrate and suspended in one of an adhesive compound and a glue.

38. The combination of claim 16, wherein said latent illuminance material is blended with an ink and printed on said body.

39. The combination of claim 16, wherein said latent illuminance material is injection molded on said body.

40. The combination of claim 16, wherein said marker further comprises a filter to absorb light having a predetermined range of wavelengths.

41. The combination of claim 40, wherein said filter comprises a thin film coating spectral absorption layer.

42. The combination of claim 40, wherein said filter comprises a rare earth element.

43. The combination of claim 42, where said rare earth element is ytterbium.

44. The combination of a data storage drive and a cartridge for said drive, said drive comprising:
a source of irradiance at an irradiance wavelength;
a detector of irradiance; and
means for enabling said drive,
said cartridge comprising:
a body;
a data storage medium in said body; and
a marker on said body, said marker being a latent illuminance material which receives irradiance from said source and emits irradiance having a spectral characteristic toward said detector for detection, said detector being connected to enable said means for enabling said drive when said detected spectral characteristic indicates a predetermined characteristic.

45. The combination of claim 44, wherein said source of irradiance is a light emitting diode (LED).

46. The combination of claim 45, wherein said LED is a flood LED.

47. The combination of claim 44, wherein said detector is one of a phototransistor and a photodiode.

48. The combination of claim 44, wherein said drive further comprises monitoring means for monitoring the output of said detector and determining said detected spectral characteristic of said marker.

49. The combination of claim 44, wherein said latent illuminance material comprises a phosphorescent material.

50. The combination of claim 49, wherein said phosphorescent material comprises at least one of a rare-earth phosphor and a Stokes phosphor.

51. The combination of claim 44, wherein said marker further comprises a filter to absorb light having a predetermined range of wavelengths.

52. The combination of claim 51, wherein said filter comprises a rare earth element.

53. The combination of claim 52, wherein said rare earth element is ytterbium.

54. The combination of a data storage drive and a cartridge for said drive, said drive comprising:
a source of irradiance at an irradiance wavelength;
a detector of irradiance; and
means for enabling said drive,
said cartridge comprising:
a body;
a data storage medium in said body; and
means for providing irradiance having a decay time toward said detector for detection, said detector being connected to enable said means for enabling said drive when said decay time of said detected irradiance substantially equals a predetermined decay time.

55. The combination of claim 54, wherein said source of irradiance is a light emitting diode (LED).

56. The combination of claim 55, wherein said LED is a flood LED.

57. The combination of claim 54, wherein said detector is one of a phototransistor and a photodiode.

58. The combination of claim 54, wherein said drive further comprises monitoring means for monitoring the output of said detector and determining said decay time of said means for providing irradiance.

59. The combination of claim 54, wherein said means for providing irradiance comprises:

means for detecting said irradiance from said source of irradiance; and
  means for emitting decaying irradiance toward said detector for detection when said irradiance is detected from said source of irradiance by said means for detecting.

60. The cartridge of claim 59, wherein said means for detecting said irradiance from said source of irradiance comprises a photodetector on said body for detecting said irradiance from said source of irradiance, and said means for emitting decaying irradiance comprises a light source on said body and electrically connected to said photodetector.

61. The combination of claim 60, wherein said light source is an LED.

62. The combination of claim 60, wherein said photodetector and said light source are disposed on an integrated circuit.

63. The combination of claim 62, wherein said integrated circuit is powered by one of a battery and said source of irradiance.

* * * * *

UNITED STATES PATENT AND TRADEMARK OFFICE
CERTIFICATE OF CORRECTION

PATENT NO.    : 6,359,745 B1
DATED         : March 19, 2002
INVENTOR(S)   : Fred C. Thomas, III et al.

It is certified that error appears in the above-identified patent and that said Letters Patent is hereby corrected as shown below:

Column 1,
Line 41, the word "RETROREFLECTIVE" should begin a new paragraph;

Column 3,
Line 60, should not begin a new paragraph;

Column 6,
Line 48, after the words "emitted at" insert the word -- at --;

Column 7,
Line 27, delete "to" and insert -- $t_o$ -- therefor;

Column 12,
Line 12, should not begin a new paragraph;
Line 23, delete the extra blank line before the paragraph beginning "As stated above,";
Line 37, delete the extra blank line before the paragraph beginning "The time constant";
Line 51, delete the extra blank line before the paragraph beginning "In one embodiment";

Column 14,
Line 39, "Without a tough binder" should not begin a new paragraph;
Line 49, delete the word "in";

Column 16,
Line 33, delete the second occurrence of the word "is".

Signed and Sealed this

Fifteenth Day of July, 2003

JAMES E. ROGAN
*Director of the United States Patent and Trademark Office*